(12) United States Patent
Schneider

(10) Patent No.: US 7,837,014 B2
(45) Date of Patent: Nov. 23, 2010

(54) HIGH PERFORMANCE RETROFIT DISK BRAKE KIT AND METHOD OF USE

(76) Inventor: Martin Schneider, 1502 Gardena Ave., Glendale, CA (US) 91204

( * ) Notice: Subject to any disclaimer, the term of this patent is extended or adjusted under 35 U.S.C. 154(b) by 970 days.

(21) Appl. No.: 11/410,604

(22) Filed: Apr. 24, 2006

(65) Prior Publication Data
US 2007/0246311 A1    Oct. 25, 2007

(51) Int. Cl.
*B60T 1/06* (2006.01)
*F16D 65/12* (2006.01)
(52) U.S. Cl. .................... 188/18 A; 188/2 D; 188/72.9; 188/265
(58) Field of Classification Search ............. 188/2 D, 188/18 A, 26, 71.1, 72.1, 72.7, 72.8, 72.9, 188/265, 73.39
See application file for complete search history.

(56) References Cited

U.S. PATENT DOCUMENTS

| | | | |
|---|---|---|---|
| 3,330,385 A * | 7/1967 | Swift | 188/73.43 |
| 3,342,291 A | 9/1967 | Warwick et al. | |
| 3,499,508 A * | 3/1970 | Swift | 188/72.9 |
| 3,688,875 A | 9/1972 | De Hoff et al. | |
| 3,907,074 A * | 9/1975 | Rist | 188/72.9 |
| 4,042,073 A * | 8/1977 | Dickenson | 188/72.9 |
| 4,050,549 A * | 9/1977 | Hori et al. | 188/72.8 |
| 4,102,440 A * | 7/1978 | Wood | 188/72.7 |
| 4,109,762 A * | 8/1978 | Wood | 188/26 |
| 4,199,042 A * | 4/1980 | Kibler | 188/18 A |
| 4,223,764 A * | 9/1980 | Flotow | 188/72.7 |
| 4,228,875 A * | 10/1980 | Haraikawa et al. | 188/72.7 |
| 4,319,668 A * | 3/1982 | Johnson et al. | 188/72.4 |
| 4,633,978 A * | 1/1987 | Hoff | 188/71.7 |
| 4,966,256 A | 10/1990 | Hunt | |
| 5,020,643 A * | 6/1991 | Redenbarger | 188/196 M |
| 5,038,895 A | 8/1991 | Evans | |
| 5,284,227 A * | 2/1994 | Pelfrey | 188/71.1 |
| 5,788,024 A | 8/1998 | Meyer | |
| 5,921,354 A * | 7/1999 | Evans | 188/73.2 |
| 6,311,808 B1 | 11/2001 | Halasy-Wimmer et al. | |
| 6,478,120 B2 | 11/2002 | Runkel et al. | |
| 6,715,588 B2 | 4/2004 | Bunker et al. | |

FOREIGN PATENT DOCUMENTS

JP          9-2216          1/1997

* cited by examiner

*Primary Examiner*—Thomas J Williams
(74) *Attorney, Agent, or Firm*—Fulwider Patton LLP

(57) ABSTRACT

A disk brake kit including a pair of brake pads disposed on opposite sides of a brake disc and carried from calipers suspended from a kit frame indexed to predetermined land marks on the wheel housing.

2 Claims, 5 Drawing Sheets

HIGH PERFORMANCE RETROFIT DISK BRAKE KIT AND METHOD OF USE

BACKGROUND OF THE INVENTION

1. Field of the Invention

The present invention relates to the field of retrofitting parking brakes on high performance sports automobiles.

2. Description of the Prior Art

Sports automobile enthusiasts often seek to modify their vehicles to test the limits of their capacity. In search of drawing the highest performance possible out of their cars, these enthusiasts realize that many of the support components also require modification or outright replacement to withstand the increased rigors of high performance. Knowledgeable sports car enthusiasts often increase the horsepower and acceleration of sports car engines beyond what the original engineering specifications. Consequently components such as the braking system should be upgraded to meet the higher demands for stopping power. Also, many aging models of sports cars incorporate worn components which are out of production and for which no parts are available for replacement.

One particular popular high end automobile that that lends itself to modification is the Porsche Model 914. Enthusiasts of the Porsche 914 often seek to increase the horsepower output of this rear wheel drive platform where rear wheel braking is critical. The original brake system for the Porsche 914 employed a combination main brake incorporating a parking brake function. While these original equipment manufacturer (OEM) brakes were sufficient for the performance of the stock model sold, modified versions of the Porsche 914 require higher braking performance which often leads to greater heat generation thus requiring more efficient heat dissipation.

Age, deterioration, improved braking requirements and unavailability of replacement OEM brakes often force the enthusiast to employ special manufactured disc-braking systems capable of achieving improved braking performance. The better performing disc brake systems for sports cars employ main brakes with hydraulically actuated action calipers and a floating spot-type caliper design for the parking brake. One of the primary advantages of the spot-type floating caliper disc brake is the ability to resist warping that is typically associated with non-spot-type caliper brakes from uneven engagement of the disc. The braking horse power necessary to slow down these modified sports cars on the main brake requires a large braking surface that already covers a large portion of the rotor arc. This is evident where OEM main brakes utilize only two pistons to actuate the calipers compared to the four or six pistons used by upgraded main brakes. Consequently, the main braking system does not have room for an additional parking brake.

A shortcoming of high performance braking systems is that they typically do not incorporate a separate parking brake system. Using a special manufactured main brake leaves the sports car modification enthusiast with three alternatives for a secondary brake. Either a parking brake function can be incorporated into the main brake or an entirely separate parking brake assembly can be mounted or a parking brake can be omitted altogether.

Most replacement main brakes require a hydraulic system and are already too large to incorporate a separate parking brake function. When retrofitting a separate parking brake (often called secondary or emergency brake), typically a drum brake requiring its own bulky mechanical subassembly is used. Most parking brakes use drum systems because there is no room to fit another hydraulic system on the wheel housing for the parking brake so drum brakes use existing mechanical components for actuation. However, using a drum brake as a parking brake requires separate tools for changing the brake shoes, requires a lengthy process for mounting the brake assembly and changing brake linings, and provides inferior braking power than a disc brake system. High performance automobiles require high performance braking. High performance braking usually requires a disk braking system that is not typically available in secondary brake systems. Secondary brakes must achieve two important functions in high end automobiles.

The first function is to assist in keeping the car in place while it is not in gear. This function lessens the strain placed on transmissions when the car is not moving or idling. It is very important to apply the secondary brake when a car with standard transmission is parked on an incline. Without it, the car is free to roll down the hill. Oftentimes one can recognize an automobile in which the OEM brake has been replaced since the consequent lack of a brake dictates the placement of a brick or other obstruction on the down hill side of a hill.

The second function of a parking brake is to serve as a secondary brake or emergency back up brake should the main brake fail. Without a secondary brake, failure of the main brake usually spells disaster since the motorist must then downshift to decelerate placing him or her at risk of failing to stop before disaster. As most sports car enthusiasts know, employing an OEM secondary brake to decelerate from high speeds runs the risk of the parking brake exceeding the capacity of the mount to withstand stress. While drum brakes are typically sufficient for use in non-sports cars, their weaker braking power and bulkiness detracts from the braking required in high end sports cars. I have discovered that by employing a spot-type disc brake for an emergency brake, braking power is improved and reliability of the brake mount is improved.

As one skilled in the art of modifying sports autos knows, seldom is the framework of an automobile conducive to non-OEM parts since the automobiles were designed as complete systems with many hours of design and engineering exerted in the elaborate interconnection of components to achieve ease of assembly and performance efficiency. Consequently, non-OEM parts often do not lend themselves to ready and convenient mounting from a wheel or wheel hub thus requiring the framework itself to be modified for receipt of the new part. Modification of the framework typically involves mutilating the components by welding and cutting metal. Disc brake systems are typically subject to these constraints and sports car enthusiasts wishing to employ high performance disc brakes on, for example, the Porsche 914 are forced to modify the components surrounding the suspension near the wheels requiring undesirable expenditures of time, money, and risk in the damage of the suspension components.

In recognition of the need for auxiliary brakes, it has been proposed to attach non-OEM disc brakes to automobile wheels. One proposed mount is observed in the U.S. Pat. No. 6,478,120 to Runkel et al. The patent to Runkel discloses an actuating apparatus with automatic clearance adjustment for vehicles using a disc brake system. The actuating apparatus uses a spot-type brake having a floating caliper. A lever is fastened to the outer end of the shaft and connected to a parking brake lever or pedal for switching the operation of the brake from main brake to parking brake mode. For attachment to the suspension, the caliper is guided onto the brake carrier so as to be in a conventional manner displaceable parallel to the axis of a brake disc. Brakes of such design suffer from a lack of secured and convenient mounting means to the suspension. While they can be guided into place, their attachment requires the modification of OEM suspension components or an OEM design that incorporates the brake in its current form. Additionally, combination brakes such a Runkel's are bulky and do not fit onto the suspension and rotor of a high end sports car wheel where two separate brakes are necessary.

U.S. Pat. No. 5,038,895 to Evans discloses a disc brake assembly that can function as both a hydraulically operated main brake and a mechanically actuated parking brake. Like Runkel's brake, the brake to Evans suffers from bulkiness and even more importantly, should the main brake pad fail, the secondary brake system is likely to also fail since they operate using the same brake pads. To the further detriment of one using Evans' brake, the system lacks a convenient and simple retrofit mounting structure that can be mounted onto an existing automobile wheel housing.

These proposed solutions in the prior art require modifying or mutilating the wheel assembly or are designed as their own OEM brake systems uncooperative for retrofitting. These solutions lack ease of installment and readiness to a preexisting wheel housing. Other related art may suggest means for mounting to a wheel housing but does not take advantage of preexisting bores outside of the wheel hub where it is less complex to mount on. Also, while the prior art references teach combining a parking brake to a main brake, many fail to suggest using separate brake pads for the main and secondary braking functions in the event the main brake should fail.

Therefore, it can be seen that a need exists in the art for a brake kit that is readily mountable to existing automotive wheel structure to provide high performance secondary braking.

SUMMARY OF THE INVENTION

Briefly and in general terms, the present invention is directed to a parking brake kit that uses a known disc brake system to readily mount onto the pre-existing components of an automobile. The parking brake kit includes a frame with a mounting bore to act as a first mounting point to a wheel structure and a second mounting point which may be an edge to abut against a boss structure to support against rotation of the frame about a bolt through bore.

One embodiment may use a spot-type floating caliper brake system. To mount the parking brake kit to the suspension, one of the halves of the caliper, typically the action half, and the kit frame is mounted onto the control arm and mounting bore. A through bore on a flange of the brake kit frame is aligned with a preexisting mounting bore on the control arm of the suspension. A contoured flange edge is placed abutting in fit with the contours of the surface of the control arm. A bolt is inserted through the two bores and the brake housing may be secured to the wheel assembly by a locking nut threaded onto the bolt. is over the position of the brake disc until the brake kit frame and action caliper half are aligned for functionality of the brake. After the brake disk is mounted into place on the wheel assembly, the floating caliper half of the is attached to the rest of the brake kit frame assembly.

The brake system may use a mechanically actuated driver to displace the brake pads towards the opposite side of a brake disk. A brake cable is actuated by a lever or similar means in the automobile driver's compartment. The kit may use an extension or connector arm to connect the parking brake cable to the actuation driver. When the cable is actuated, an actuation driver displaces the action caliper half brake pad toward the brake disc by using a cam action to push against a brake pad support engaging the brake pad to the disc. The reaction caliper half pad on the other side of the brake disc is displaced by reactionary forces associated with the action caliper half moving toward the disc. The reaction caliper half then moves toward the other side of the disc to engage a brake pad on its end with the surface of the disc.

Other features and advantages of the invention will become apparent from the following detailed description, taken in conjunction with the accompanying drawings which illustrate, by way of example, the features of the invention

DETAILED DESCRIPTION OF THE PREFERRED EMBODIMENTS

Figure 8:
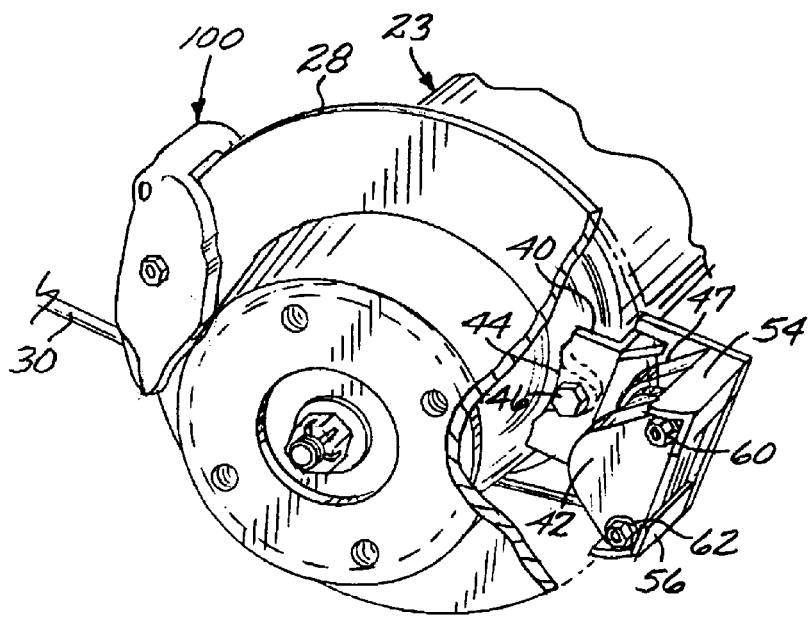
FIG. 8 is perspective view, in reduced scale, and partially broken away of the brake kit shown in FIG. 3, mounted on an OEM brake disk wheel assembly.
Figure 9:
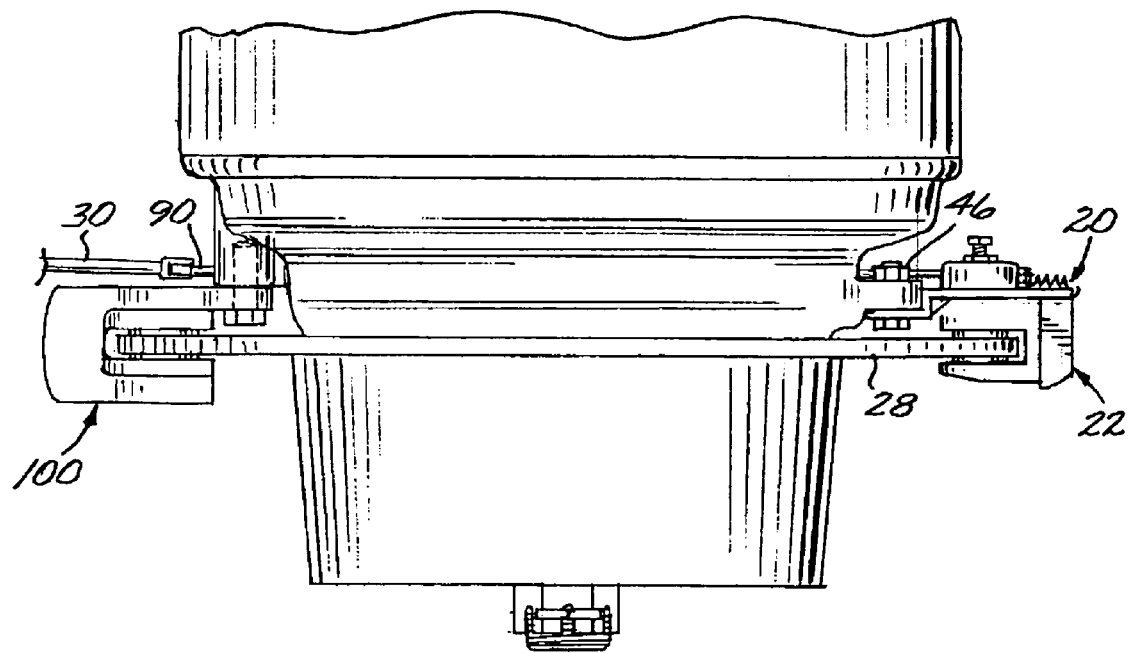
FIG. 9 is a top view, in enlarged scale, of the brake kit shown in FIG. 8.
Figure 10:
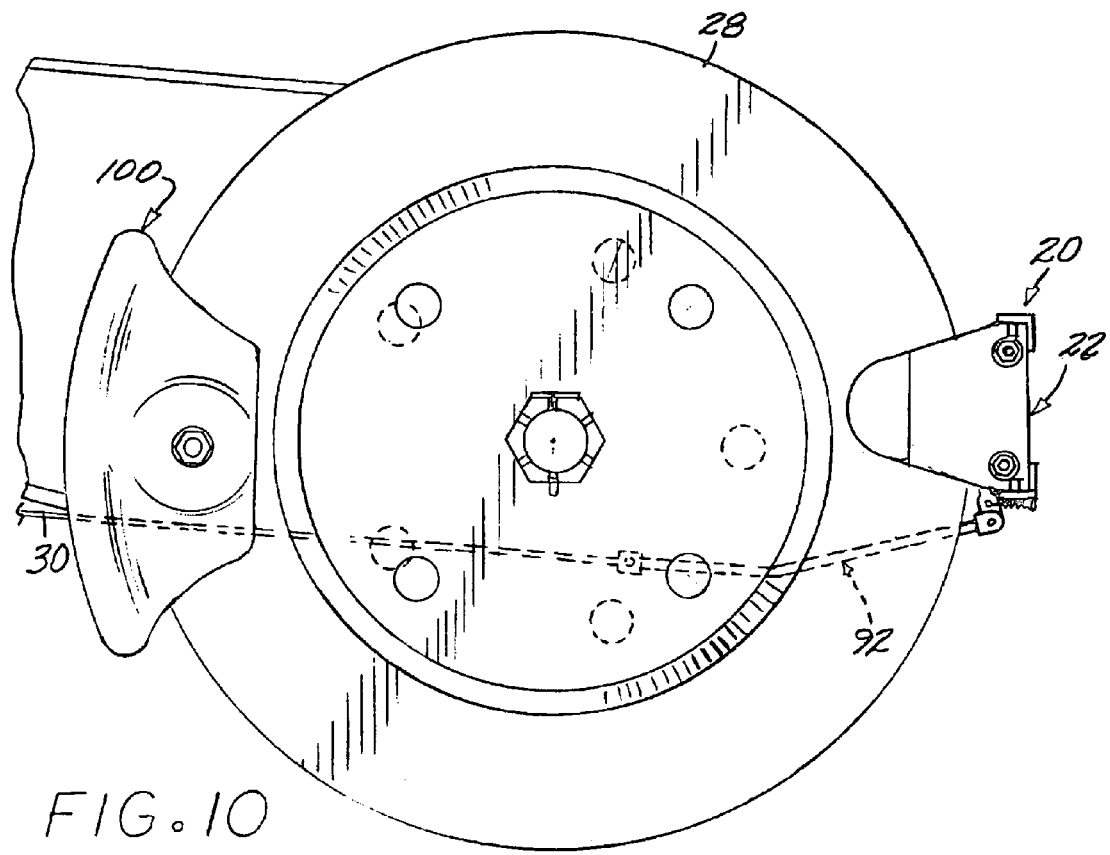
FIG. 10 is a front view, in enlarged scale, of the wheel and brake kit shown in FIG. 9.

Referring to FIGS. 8-10, the high performance replacement brake kit 20 of the present invention may be configured with a frame 22 to mount on a wheel housing defined by a control arm 23 formed with an axial boss 26 whose exterior is defined by an abutment surface 27 and a mounting bore 34. The frame mounts a pair of pads 33 and 35 to act on a brake disk 28 carried from the wheel. A brake disk 28 is receivable on an axle 24 and mounted over a wheel hub 22 (not shown) A parking brake cable 30 may be pulled to draw the pads into contact with the disk.

Sports car enthusiasts often upgrade the performance of an automobile engine allowing the car to rapidly accelerate to high speeds but leave the standard braking mechanism on the automobile thus failing to account for the greater kinetic energy that must be counteracted to provide a safe rate of deceleration. Even when more robust brake pad systems are installed, the driver is left without an operating hand or emergency brake system to apply when the car is parked or to actuate as a back-up should the hydraulic brakes fail. Furthermore, within a relatively short period after a model year, production of OEM parts is often discontinued thus making them unavailable to the owners of older or vintage automobiles thereby leaving the owner with the expense of custom made components for a replacement braking system. It is desirable to have a replacement brake installation kit which will be available to the customer and can conveniently be installed relatively rapidly and without need for high skilled mechanics.

Automobile wheel construction typically incorporates an axel, wheel housing and disk brake which maybe acted on by OEM disk pads. It is desirable to have a replacement kit which will hang directly from an index to the wheel housing in a manner which will position the brake calipers directly over the brake disk and which may be coupled with the parking brake cable for actuation thereof when the automobile is in a parked position or in the event the hydraulic brakes fail thus providing a secondary backup deceleration system.

Brake disks are typically coupled to axels which may be driven by the vehicle drive train and may be covered by a dust cover or the like. In any event, by removing certain components from a wheel housing, such disk may be made accessible for installation in the housing of an auxiliary or replacement brake mechanism, in the form of brake pad calipers, to be actuated by a parking brake cable or the like.

One high performance sports car on which the replacement brake system of the present invention may be mounted is a Porsche automobile which includes a wheel housing in the form of the control arm 23 having a cylindrical boss 26 projecting axially therefrom and typically configured with a mounting flange 32 (FIG. 4) which is formed with a mounting bore 34 conventionally utilized to mount OEM equipment such as a dust cover from the control arm. The OEM brake disk 28 (FIGS. 8 and 9) is disposed in a vertical plane parallel to and spaced axially outwardly an inch or so from the control arm mounting flange 32. I have discovered that the mounting flange 32 constitutes a convenient attachment point for the OEM high performance replacement brake of the present invention. Generally, the brake kit includes a frame 22 mounted to the flange 32 to bring a pair of brake pads 33 and 35 on opposite sides of the disk to be a actuated by a brake cable 30.

Figure 1:
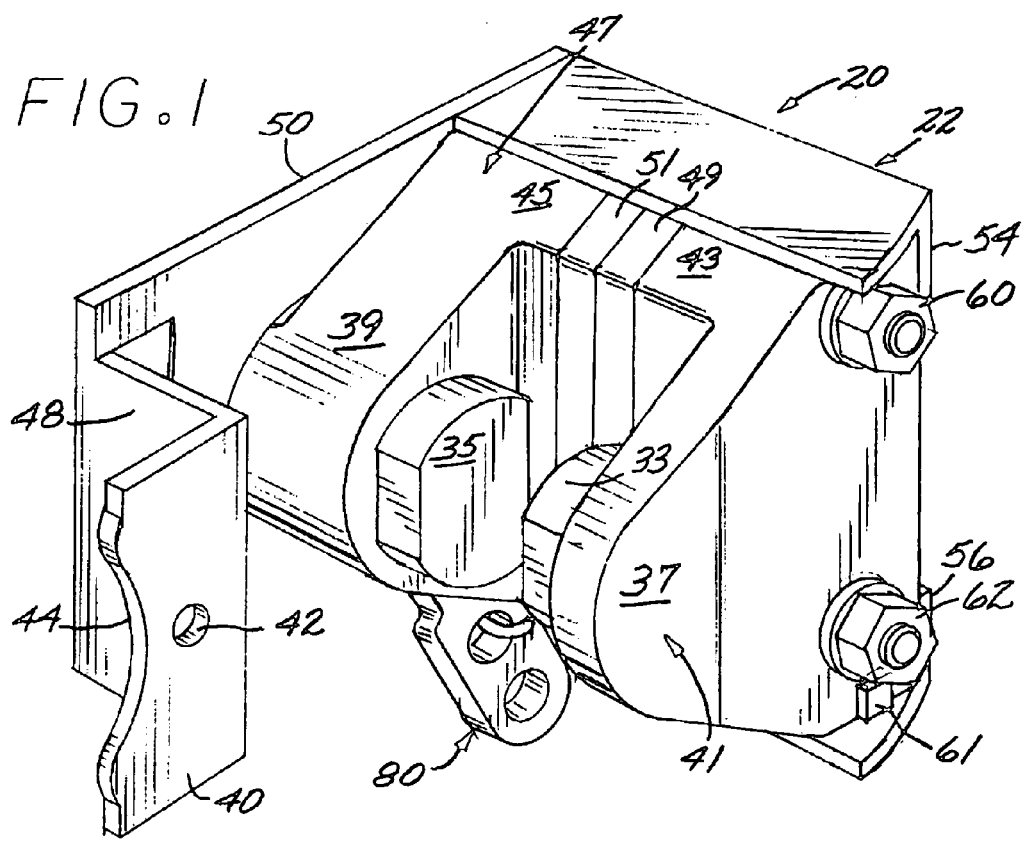
FIG. 1 is a right side perspective view of the high performance retrofit brake kit of the present invention.
Figure 2:
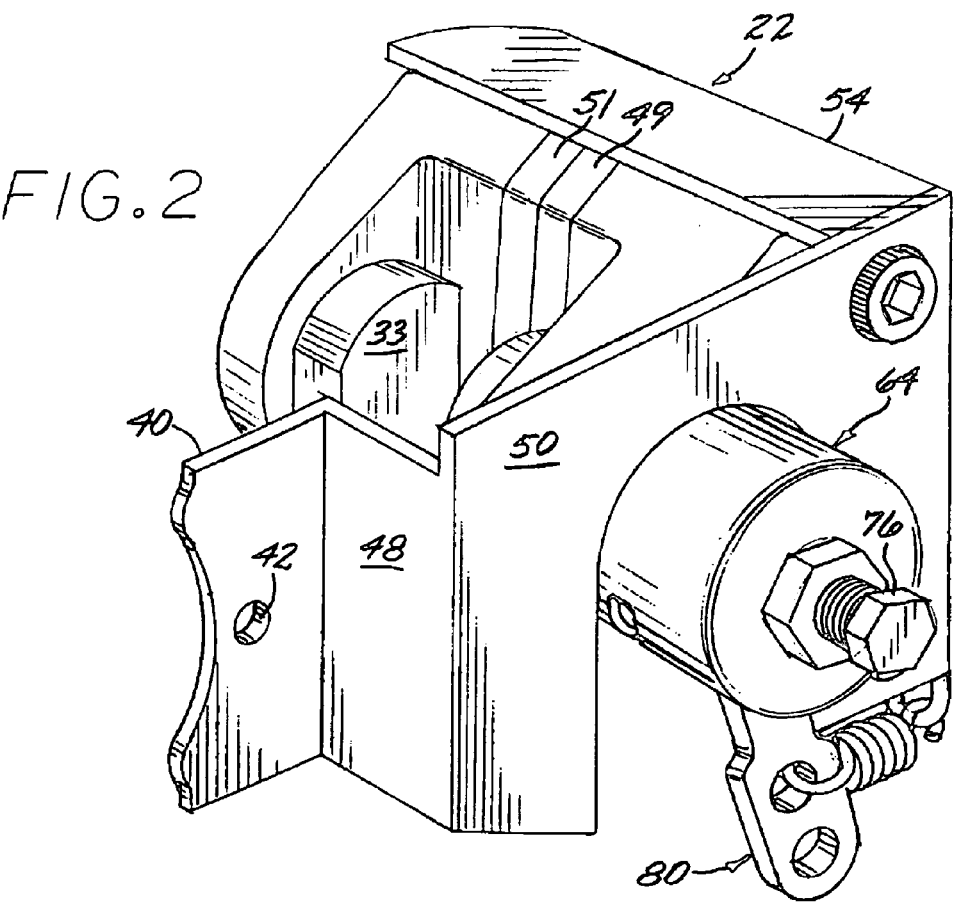
FIG. 2 is a left side perspective view of the brake kit shown in FIG. 1.
Figure 3:
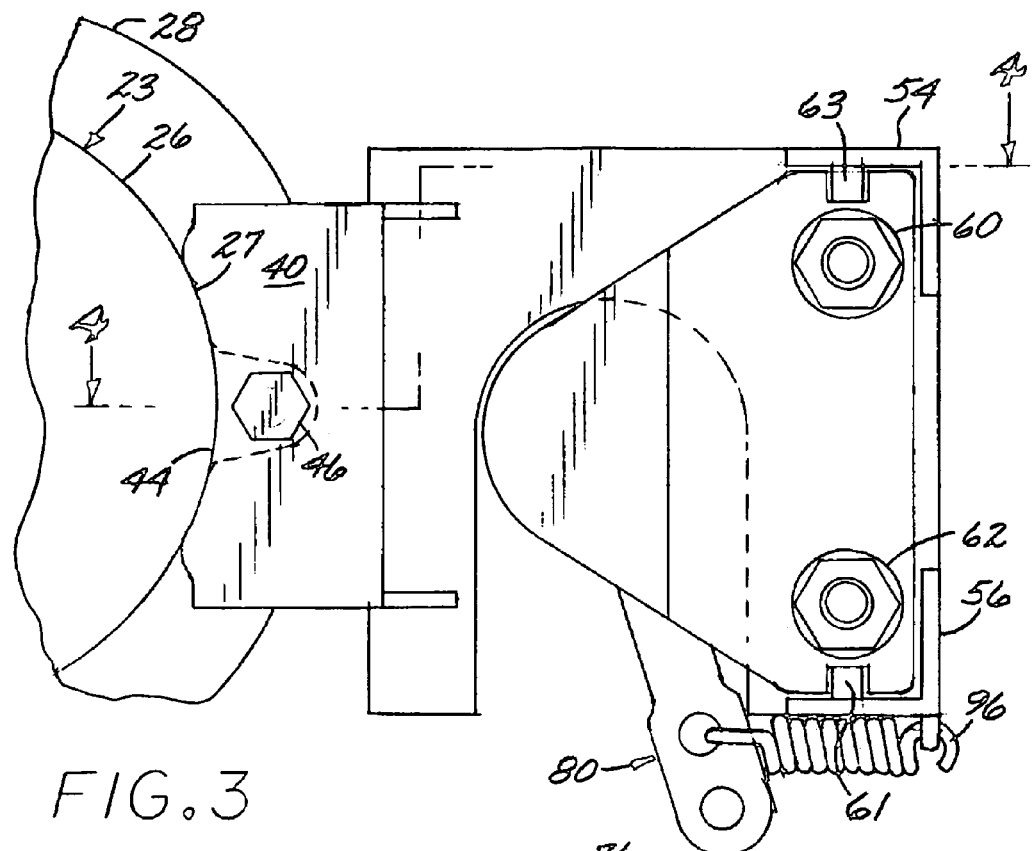
FIG. 3 is a right hand of the brake kit shown in FIG. 1 mounted to a wheel assembly.
Figure 4:
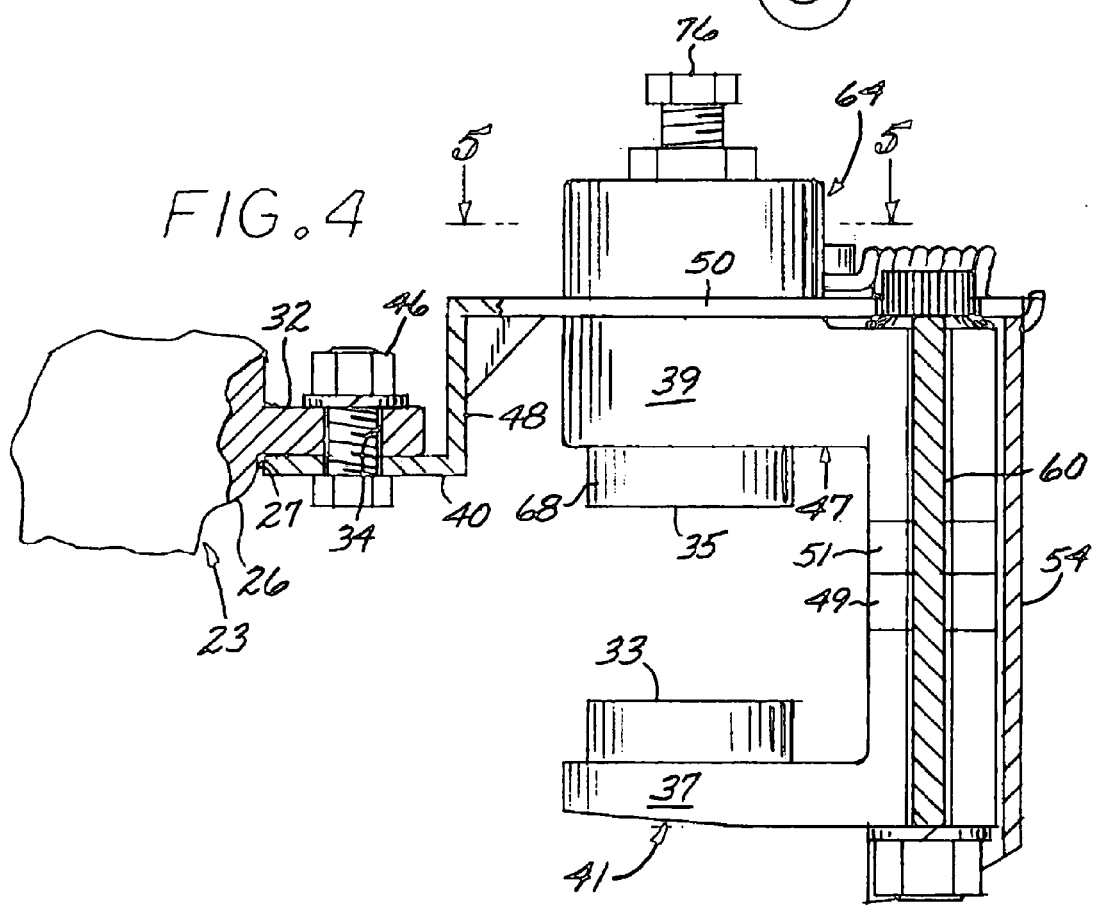
FIG. 4 is a broken sectional view of the kit taken along the line 4-4 of FIG. 3.
Figure 5:
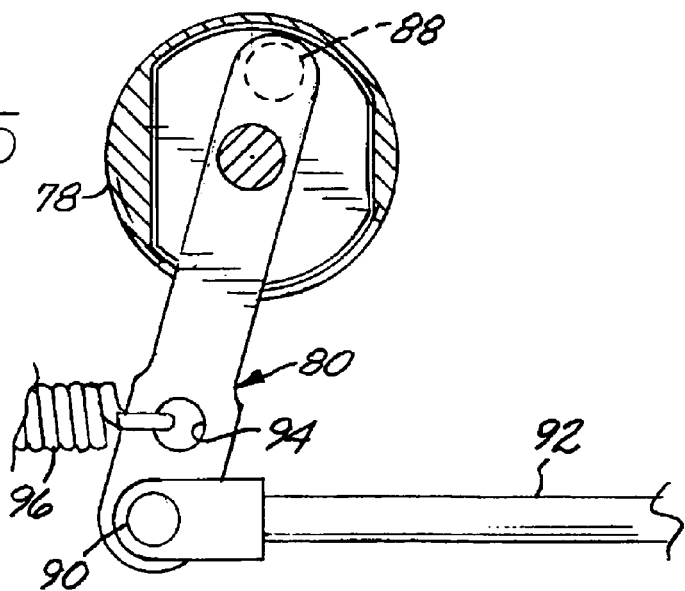
FIG. 5 is a transverse sectional view taken along the line 4-4 of FIG. 4 showing the connection structure of the actuation arm.
Figure 6:
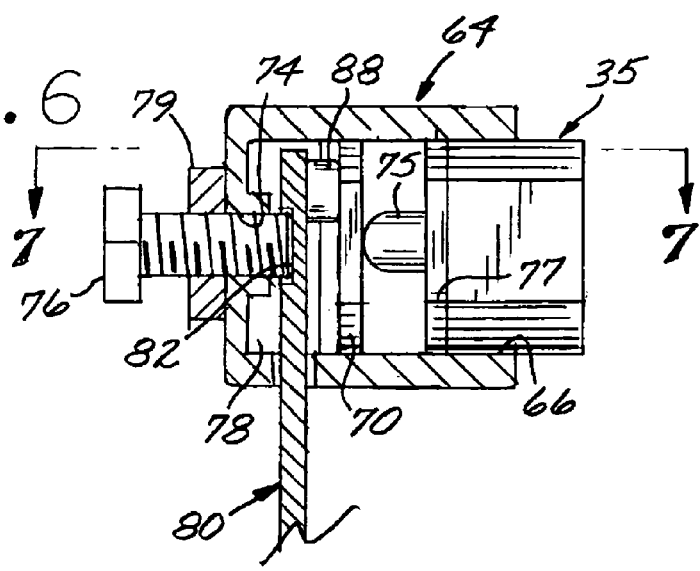
FIG. 6 is a longitudinal sectional view taken through the connection structure of the actuation arm shown in FIG. 5.
Figure 7:
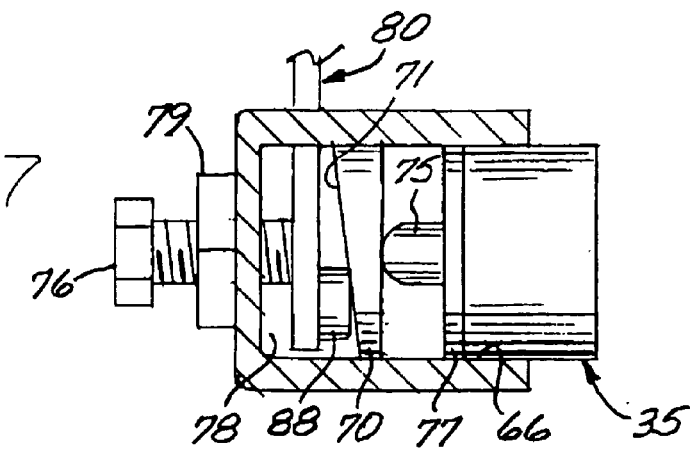
FIG. 7 is a sectional view taken along the line 7-7 of FIG. 6 showing the inclined surface of the rotary cam.
Figure 11:
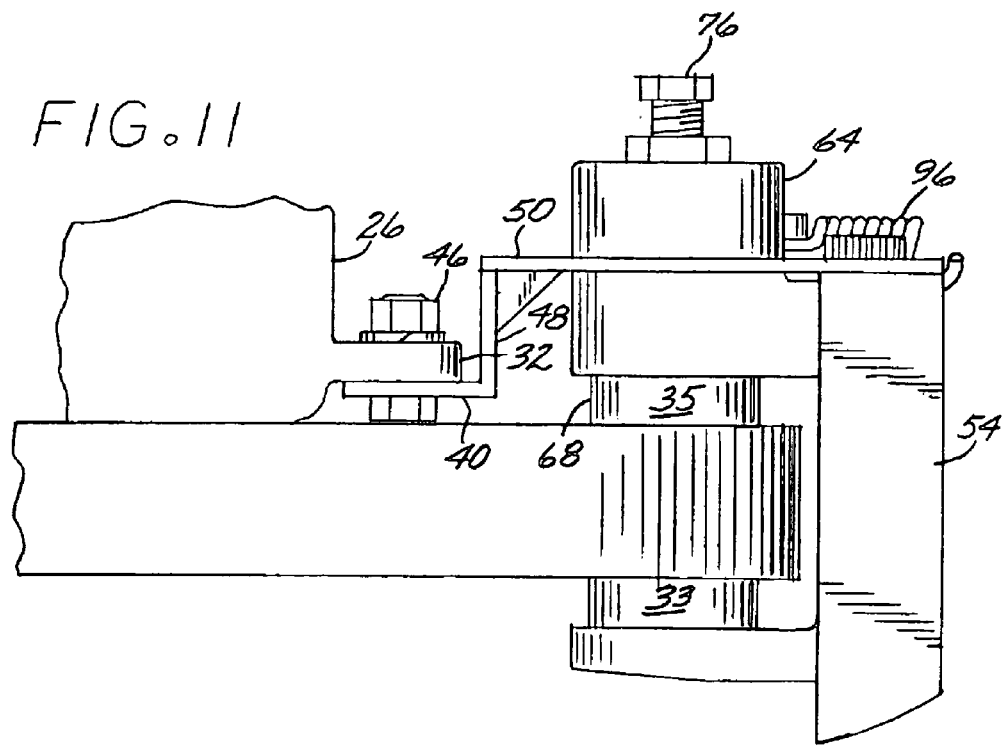
FIG. 11 is a partial top view, in enlarged scale, of the wheel and brake kit shown in FIG. 10.

The frame 22 is vertically elongated and, in top plan view (FIG. 1), is configured with a vertically mounting flange 40 (FIG. 4) to be oriented parallel with the brake disk, spaced axially inwardly therefrom and formed centrally with a mounting bore 42 to be aligned with mounting bore 34 in the flange 32 (FIG. 4). Such flange is configured at its rear extremity with a somewhat C-shaped contoured abutment surface 44 to compliment the vertical profile of the boss 26 to thus cooperate with the mounting bolt 46 through the bore 42 to mount the frame cantileverly from the flange 32. The frame 22 is viewed in top plan view (FIG. 4), is configured with an orthogonal axially inwardly projecting offset plate 48 and an orthogonal rearwardly projecting support plate 50 which is formed at its rear extremity with a pair of vertically spaced bores to receive securing bolts 60 and 62. The plates 48 and 50 are supported at their intersections by gussets (FIG. 11). The arms 41 and 47 are formed rearwardly with axially projecting legs 43 and 45, respectively, and include respective laterally spaced part, rearwardly projecting legs 37 and 39 mounting the brake pads on the confronting rearward extremities thereof Sandwiched between the confronting ends of the legs 43 and 45 are a pair of spacer blocks 49 and 51 (FIG. 1). The securing bolts 60 and 62 secure the arms and spacers together and are receivable through the bores of the plate 50. Capping the upper and lower rear corners of the frame 22 are right angle strips 54 and 56, respectively. The free extremities of the strips 54 and 56 are tapered at their edges providing wheel clearance while the other extremities are rigidly fixed to the support plate 50 (FIG. 11). Within the right angle strips are male guides 61 and 63 for receipt in female grooves formed in the rearward extremities of caliper legs 43 and 45, (FIGS. 1 and 3). The rear extremity of the caliper arm 47 is formed with an enlarged in diameter axial bore mounting a cup shaped piston housing, generally designated 64 (FIGS. 4 and 6). The piston housing 64 is formed with an inwardly opening piston chamber 66 which receives a piston cylindrical 35 including a piston 77 therein. The housing 64 is formed at its closed end with an axial, threaded bore 74 which receives as an adjustment stud 76 having a lock nut 79 received thereon. Referring to FIGS. 2 and 5-7, such housing 64 is also formed in its peripheral wall with a circumferential clearance slot 78.

A control lever, generally designated 80 projects radially through the slot 78 and is formed intermediately with a blind axial mounting bore 82 (FIG. 6) that receives the distal end of the adjustment stud 76 and is configured on one end with an axially outwardly projecting cylindrical cam driver 88. Sandwiched between the distal end of such driver and the piston is a wedge shaped axial cross section, circular cam follower 70 housing an inclined surface 71 such that pivoting of the arm about the stud 76 causes the piston 75 to be selectively driven toward the brake pad support and confronting brake pad 33 (FIG. 6).

The free extremity of the control arm 80 is formed with a through bore for receipt of connector pin 90 connecting one extremity of connector fitting, generally designated 92 therewith to connect with the brake cable 30. The arm 80 is formed intermediately with a through bore 94 to which is hooked one end of a coil return spring 96 drawing the arm clockwise as viewed in FIG. 5.

It will be appreciated that an automobile may include a conventional hydraulic brake caliper, generally designated 100 (FIG. 8) mounted from the wheel housing and embracing the forward periphery of the brake disk 28. In practice the parking brake 20 of the present invention may be mounted from the brake housing to the rear side of the disk 28 diametrically opposite the hydraulic brake caliper 100. The replacement kit of the present invention will typically be packaged with all components together in a replacement kit package. If a workman desires to install the present replacement kit, he or she will remove the bolt mounting the dust cap (not shown) and any other parts not necessary to operation to provide clearance for installation of the present kit. The kit of the present invention can be withdrawn from the packaging and the dust cap bolt removed from the mounting flange 32 of the brake arm (FIG. 4) for access thereto.

The brake kit will typically be preassembled with the components generally in the configuration shown in FIG. 1 and the installer need only to align the bore 42 of the frame flange 40 with the bore 34 in the mounting flange 32 abutting the semicircular abutment surface 44 with the periphery of the boss abutment surface 27 shown in FIG. 4 to insert the bolt 46 to act as an anchor to the flange 32 and maintain the abutment surface 44 abutted in firm contact with the surface 27 to thereby suspend the frame 22 in position with the caliper arranged disposing the disk pads 33 and 35 on the opposite sides of the disk 28 (FIGS. 4 and 8). The mounting bolt 46 will then be inserted and tightened and the cable adaptor 92 connected between the free extremity of the actuation arm 80 and the cable to ready the replacement brake kit for operation. The screw thread components at the end of the connector 92 may be adjusted to adjust the length thereof to provide the desired travel for the free extremity arm to provide the desired cam effect for control of the piston 68 and consequent engagement of the spot pad with the brake disk.

In operation of the automobile it will be appreciated that in normal stopping conditions, the hydraulic brakes may be actuated to actuate the hydraulic caliper 100 to slow the vehicle. In other instances, as for instance where the hydraulic brakes are inadequate or in the event they should fail, it will be possible for the driver to pull the emergency brake lever to draw the emergency cable and rotate the lever 80 (FIG. 5) clockwise to drive the cam driver 88 across the surface of the wedge cam follower 70 to the thick side to drive the piston 75 outwardly in the housing 64 driving the brake pad 35 into contact with the near side of the brake disk 28 with adequate force to apply sufficient frictional drag to the disk to positively slow the vehicle. The reaction caliper half 41 and brake pad 33 will displace towards the brake disk as reactionary forces caused by the contact of pad 35 to the disk cause the pad 33 to contact the opposite side of the brake disk. This then provides a braking function that would otherwise not be available and enhances the safety of operation of the vehicle.

When the brake pad calipers are actuated to close the pads on the disk 28 such pads will provide frictional drag force to the disk 28 to resist rotation thereof. As for example, assuming the automobile wheels are rotating in the forward direction to rotate the disk 28 in the counterclockwise direction as viewed in FIG. 8, application of the brake pads will tend to resist that rotation with the reactive forces thereof being applied to the free end of the cantileverly mounted frame 22 upwardly tending to also rotate in a counterclockwise direction about the mounting bolt 46. This braking force will be resisted by the frame as dictated by the fact that mounting bolt 46 is subjected to shear forces and rotation of the mounting flange 40 about such bolt will be resisted by the contact of the contoured abutment surface 44 of that flange with the abutment surface 27 of the boss 26.

As will be appreciated of those skilled in the art, the frame 22 may take many different forms and shapes, it being important that it index to the wheel housing in such a manner that when so indexed and oriented, the brake pads are in position on opposite sides of the disk for operation thereof. For the purposes of this description it is intended that the mounting flange 40 will include at least two attachment points, one being the bore 42 which receives the mounting bolt 46 and the other being, for instance, a second mounting bore or other abutment arrangements such as the contoured abutment surface 44 which engages the abutment surface 27 on the boss 26 to limit rotation of the frame about the bolt 46 to thereby carry the weight of the frame and calipers, as well as to provide robust resistance to the frictional forces applied to the brake pads when they are actuated against the brake disk 28. By providing for the mounting of such flange to known landmarks, such as the mounting bore 34 on the flange 32 (FIG. 4) and abutment against another anchor point, to position the frame 22 so as to properly orient the brake pads and to position the control arm 80 to be drawn by the cable 30, quick efficient and reliable mounting is assured.

I claim:

1. An aftermarket parking brake kit for mounting on a wheel assembly of a predetermined configuration and including a wheel housing formed with a single mounting bore and a boss defining an axially projecting convex cylindrical stop surface spaced laterally from the bore, all disposed in a predetermined relationship relative to a brake disk carried on a wheel axle and a brake cable, the kit compromising:
   first and second disk pads disposed on opposite sides of the disk and moveable into contact with the opposite sides;
   a kit frame comprising:
   a vertical mounting flange including a single through bore, the through bore configured to align with the single mounting bore;
   a concave cylindrical index surface for engaging the stop surface to hold the frame in a selected position relative to the disk;
   a vertical plate offset from the mounting flange; and
   a pair of axially projecting support strips extending from a distal end of the vertical plate;
   first and second legs sections for mounting the first and second disk pads to the support strips of the kit frame;
   a driver carried from the kit frame, connected with the second disk pad, and operable to drive the second pad toward the first disk pad to engage the brake disk;
   a connector connecting the brake cable with the driver; and
   a kit mounting bolt to be received through the through bore and mounting bore to hold the kit frame in the selected position to hold the index surface engaged against the stop surface whereby the cable may be pulled to actuate the driver and drive the second brake pad into engagement with the brake disk.

2. An retrofit brake kit for mounting on a wheel assembly of a predetermined configuration and including a wheel housing formed with a single mounting bore and a boss defining an axially projecting convex cylindrical stop surface spaced laterally from the bore, all disposed in a predetermined relationship relative to a brake disk carried on a wheel axle, the kit compromising:
   first and second disk pads disposed on opposite sides of the disk and moveable into contact with the opposite sides;
   a kit frame comprising:
   a vertical mounting flange including a single through bore, the through bore configured to align with the mounting bore;
   a concave index surface for engaging the stop surface to cooperate in holding the frame in a selected position relative to the disk;
   a vertical plate offset from the mounting flange; and
   a pair of axially projecting support strips extending from a distal end of the vertical plate;
   first and second legs sections for mounting the first and second disk pads to the support strips of the kit frame;
   a driver carried from the kit frame, connected with the second disk pad, and operable to drive the second pad toward the first disk pad to engage the brake disk; and
   a kit mounting bolt to be received through the through bore and mounting bore to cooperate with the stop surface to hold the kit frame in the selected position.

* * * * *